(12) United States Patent
Bao et al.

(10) Patent No.: US 11,510,359 B2
(45) Date of Patent: Nov. 29, 2022

(54) AUTOMATIC FEEDING DEVICE AND METHOD FOR SEEDLING BED OF TRANSPLANTER

(71) Applicant: ZHEJIANG UNIVERSITY, Hangzhou (CN)

(72) Inventors: Yidan Bao, Hangzhou (CN); Yong He, Hangzhou (CN); Yue Yu, Hangzhou (CN); Yufei Liu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 366 days.

(21) Appl. No.: 16/936,253

(22) Filed: Jul. 22, 2020

(65) Prior Publication Data

US 2021/0176914 A1 Jun. 17, 2021

(30) Foreign Application Priority Data

Dec. 17, 2019 (CN) .......................... 201911304559.2

(51) Int. Cl.
*A01C 11/02* (2006.01)
*A01C 11/00* (2006.01)

(52) U.S. Cl.
CPC .......... *A01C 11/025* (2013.01); *A01C 11/006* (2013.01)

(58) Field of Classification Search
CPC ....... A01C 11/00; A01C 11/006; A01C 11/02; A01C 11/025; A01C 11/04
See application file for complete search history.

(56) References Cited

U.S. PATENT DOCUMENTS

| | | | | | |
|---|---|---|---|---|---|
| 4,408,549 | A | * | 10/1983 | Qvarnstrom | A01C 11/025 111/105 |
| 5,644,999 | A | * | 7/1997 | Williames | A01C 11/025 111/105 |
| 8,078,367 | B2 | * | 12/2011 | Sauder | B60Q 1/26 715/965 |
| 11,350,560 | B1 | * | 6/2022 | Buell | A01C 11/025 |
| 2006/0260522 | A1 | * | 11/2006 | Fountain | A01G 9/086 111/105 |

FOREIGN PATENT DOCUMENTS

| CN | 103425134 | 12/2013 |
|---|---|---|
| CN | 110235575 | 9/2019 |

* cited by examiner

*Primary Examiner* — Jamie L McGowan
(74) *Attorney, Agent, or Firm* — Jeffrey D. Moy; Weiss & Moy, PC

(57) ABSTRACT

An automatic feeding device and method for a seedling bed of a transplanter, comprising: a bracket installed on the transplanter; several trays, obliquely arranged on the bracket downwards, and the bottom of the trays being provided with release mechanisms for releasing the rice seedling bed; a conveyor belt, arranged on the bracket; a photoelectric sensor, arranged on the transplanting platform; and a controller, in communication connection with the photoelectric sensor, when the photoelectric sensor detects that the height of the remaining rice seedling bed on the transplanting platform is lower than the height of the photoelectric sensor. Only one driver is needed to operate, so that the labor input is greatly reduced, and the labor intensity is reduced; meanwhile, the space is saved by the reduction of the number of workers, enabling more seedling raw materials to be stored.

12 Claims, 4 Drawing Sheets

AUTOMATIC FEEDING DEVICE AND METHOD FOR SEEDLING BED OF TRANSPLANTER

CROSS REFERENCE TO RELATED APPLICATION

This application claims the priority of Chinese Patent Application No. 201911304559.2 entitled "AUTOMATIC FEEDING DEVICE AND METHOD FOR SEEDLING BED OF TRANSPLANTER" filed with the Chinese Patent Office on Dec. 17, 2019, which is incorporated herein by reference in its entirety.

TECHNICAL FIELD

The invention relates to the technical field of agricultural mechanical equipment, in particular to an automatic feeding device and method for seedling bed of transplanter.

BACKGROUND

A transplanter is an agricultural machine capable of automatically transplanting rice seedlings into a rice field: in the operation process, a certain amount of rice seedlings are grabbed from the seedling bed on the transplanting platform by the mechanical claw and planted into soil, to thereby complete the automatic seedling transplanting. However, the conventional riding transplanter requires two operators to operate in cooperation to complete transplanting work. One person is responsible for driving the transplanter, and the other person is responsible for feeding the seedling bed.

With the application of GPS automatic navigation in agriculture, some transplanter automatic navigation driving systems, such as a satellite navigation automatic driving system and a method thereof disclosed in Chinese patent publication No. CN103425134A, but such schemes can only solve the problem of self-walking of transplanters, and still require one person to complete the work of transferring the seedling bed, and cannot achieve true unmanned operation. Therefore, an automatic feeding device for the seedling bed of the transplanter is urgently needed to solve the problem of automatic feeding for the seedling bed.

Chinese patent publication No. CN110235575A discloses an automatic seedling feeding device, for transplanter, comprising: a vehicle body and a seedling box; the vehicle body is connected with the seedling box through a connecting device; a prepared seedling placing frame on the vehicle body is connected with a prepared seedling conveying mechanism; the prepared seedling conveying mechanism is connected with the prepared seedling pushing mechanism; the prepared seedling pushing mechanism is connected with the prepared seedling transferring mechanism; the prepared seedling transferring mechanism is connected with a seedling box; a prepared seedling placing frame for placing the seedling in trays on the prepared seedling placing frame by workers, which is also used for transmitting the tray and the seedlings on the tray to the prepared seedling conveying mechanism; the prepared seedling conveying mechanism, used for conveying the tray and the seedlings on the tray to the prepared seedling pushing mechanism; the prepared seedling pushing mechanism, used for transmitting the tray to the empty tray recovery device and transmitting the seedlings to the seedling prepared seedling transferring mechanism; and the prepared seedling transferring mechanism, used for transferring the seedlings to the seedling box.

Although the above conventional transplanter achieves automatic feeding of the seedling bed, its structure is complex, the process is tedious, and it takes up a large space.

SUMMARY

The invention aims to provide an automatic feeding device and method for seedling bed of transplanter, which solve the problem of automatic feeding of the seedling bed of the transplanter on one hand, and on the other hand enable the seedling bed to be loaded through a simple and easy-to-operate structure, and occupy little space.

In order to achieve the above object, in one aspect, the present invention provides an automatic feeding device for seedling bed of transplanter, including:

a bracket, installed on the transplanter;

several trays, obliquely arranged on the bracket downwards and used for placing the rice seedling bed, and the bottom ends of the trays being provided with release mechanisms for releasing the rice seedling bed;

a conveyor belt, arranged on the bracket, and positioned at the bottom of the tray, and the end of the conveyor belt being connected with a transplanting platform of the transplanter;

a photoelectric sensor, arranged on the transplanting platform and used for detecting the height of the remaining rice seedling bed on the transplanting platform;

a controller, in communication connection with the photoelectric sensor, which sends a signal for controlling the tray to release the rice seedling bed when the photoelectric sensor detects that the height of the remaining rice seedling bed on the transplanting platform is lower than the height of the photoelectric sensor.

In the above technical solution, the transplanter only needs one operator to operate, so that the labor input is greatly reduced, and the labor intensity is reduced; meanwhile, the space is saved by the reduction of the number of workers, enabling more seedling raw materials to be stored. The tray and the conveyor belt can be suspended above the driver's seat by the bracket, so that the space of the driver's seat is not occupied. The invention can be applied with a transplanter with an automatic navigation function, and realizes the real unmanned operation of the transplanter.

In order to facilitate feeding, the release mechanism preferably includes a movable baffle arranged at the end of the tray and a steering engine for controlling the movable baffle to rotate.

Preferably, the bracket is mounted with a motor for controlling the transmission of the conveyor belt, and the motor is in communication connection with the controller.

Preferably, the trays are arranged in several rows and mounted on the bracket. Preferably, each row of trays is correspondingly provided with a corresponding photoelectric sensor and conveyor belt.

According to the size of the transplanter, n trays are arranged in each row. Taking a 6-row transplanter as an example, the transplanter is provided with the seedling bed automatic feeding device, can carry 6×n standard seedling beds of the transplanter at most in one operation, while a common transplanter can only carry 6-10 seedling beds with the same size in one operation. By comparison, the transplanter having the automatic feeding device for the seedling bed has a greatly increased single-time working area.

During the transplanting operation of the transplanter, the transplanting platform shakes to a certain extent due to uneven ground. In order to ensure that the rice seedling bed is stably conveyed by the conveyor belt to enter the transplanting platform, the conveyor belt is preferably connected with the transplanting platform through a rubber connector.

On the other hand, the automatic feeding method of the seedling bed of the transplanter, provided by the invention, is realized based on the automatic feeding device of the seedling bed of the transplanter, and includes the following steps:

step 1) assuming that the trays are arranged in several rows, with N trays in each row, loading each tray with a rice seedling bed of a fixed size, with release mechanisms at the bottom of the trays all in a closed state;

step 2) initializing each electronic device to enable the electronic device to operate normally;

step 3) using a variable j to represent a serial number of an inclined tray to be released in each row, and initializing the variable j to be 1;

step 4) detecting a return value of the photoelectric sensor in a row at issue, and if the return value is 'no need of supplement', continuing to detect;

step 5) if the return value is "in need of supplement", judging whether the variable j at the moment is equal to N, and if the variable j is equal to N, indicating that the rice seedling bed loaded in the row are completely used up (in order to avoid the situation that a certain row is in idle operation during the operation of the transplanter, it shall be assured that each row is provided with enough seedlings. So according to the working convention, the transplanter needs to stop to supplement the seedling bed at the moment);

step 6) if j does not reach N, controlling the steering engine of the jth inclined tray in the row to rotate and releasing the seedling bed;

step 7) controlling transmission of the conveyor belt, and conveying the seedling bed to the transplanting platform of the transplanter;

step 8) adding 1 to the value of the variable j, and continuing to detect the return value of the photoelectric sensor.

Compared with the prior art, the invention has the following beneficial effects:

compared with the prior art, the automatic feeding device and method for the seedling bed of the transplanter only need one driver for operation, so that the labor input is greatly reduced, and the labor intensity is reduced; meanwhile, the space is saved by the reduction of the number of workers, enabling more seedling raw materials to be stored.

DETAILED DESCRIPTION OF THE EMBODIMENTS

The present invention will be further described with reference to the following embodiments and accompanying drawings, to make the objects, technical solutions and advantages of the present invention more clear.

Embodiments

Figure 1:
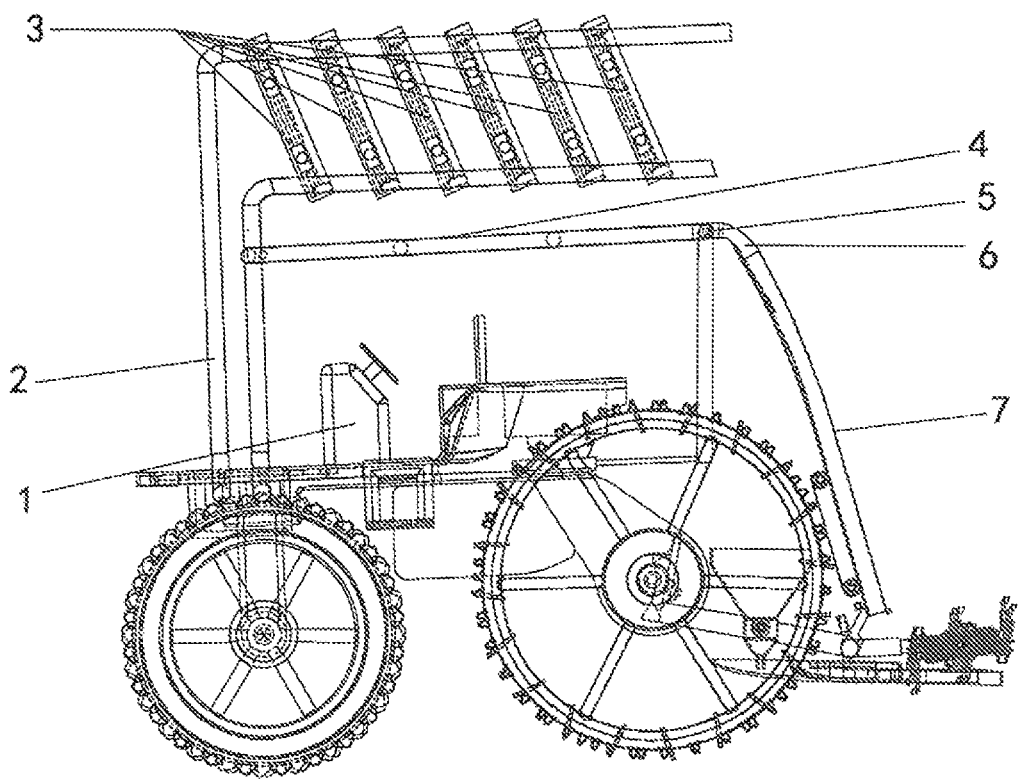
FIG. 1 is a schematic view of the overall structure of an automatic feeding device for seedling bed of transplanter in the embodiment of the invention.

Referring to FIG. 1, the automatic feeding device for the seedling bed of the transplanter in the embodiment comprises: a controller 1, a bracket 2, a tray 3, a conveyor belt 4 and a driving motor 5, a rubber connector 6 and a photoelectric sensor 7.

Figure 3:
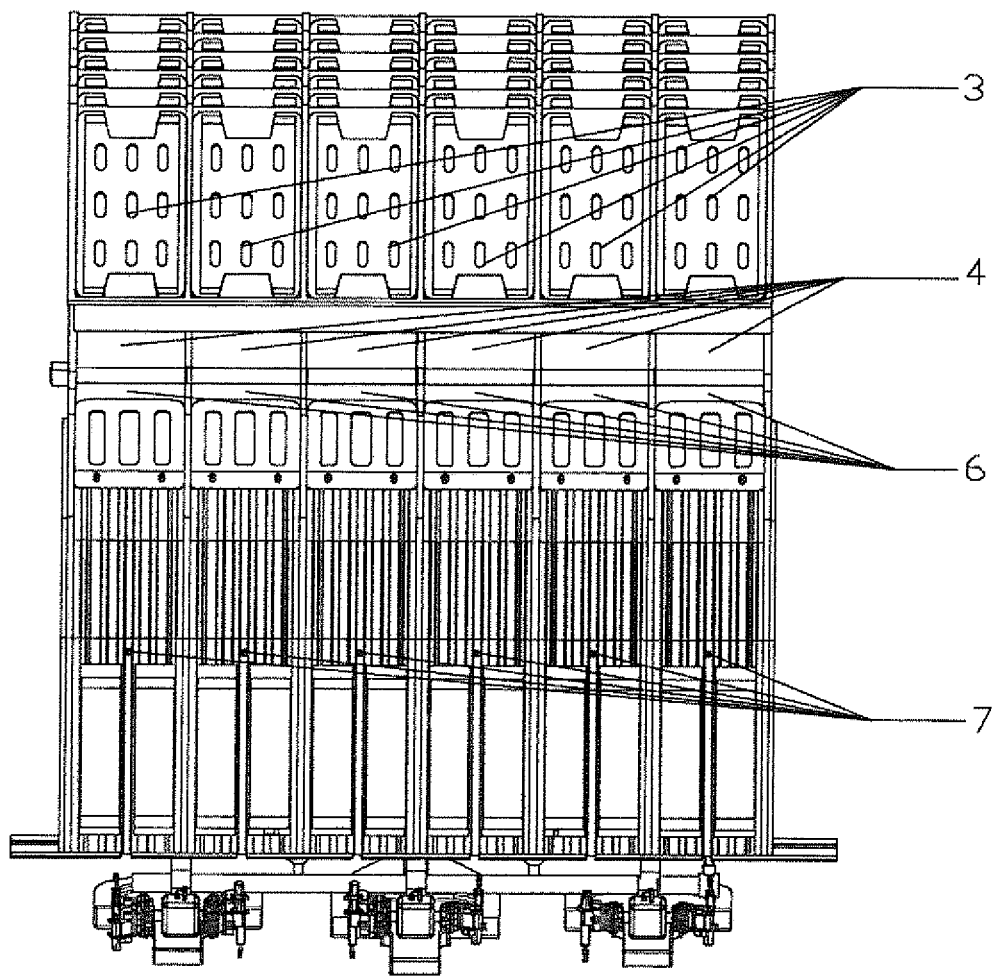
FIG. 3 is a schematic structural diagram of the transplanter in an embodiment of the present invention.
Figure 4:
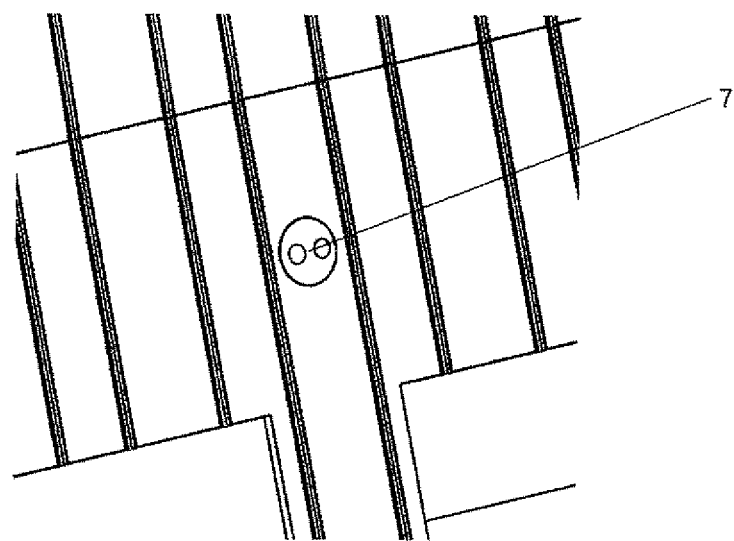
FIG. 4 is an enlarged schematic view of a photoelectric sensor in an embodiment of the present invention.

The photoelectric sensor 7 is positioned on the bottom surface of the transplanting platform and is opposite to the rice seedling bed on the surface of the transplanting platform, as shown in FIG. 3, and its partial enlarged view is shown in FIG. 4. When the transplanter transplants seedlings, the seedlings on the transplanting platform are continuously grabbed and reduced, and when the end of the remaining seedling bed is higher than the position of the photoelectric sensor 7, the photoelectric sensor 7 returns a signal of "need of supplement" to the controller 1; when the end of the remaining seedling bed is lower than the position of the photoelectric sensor 7, the photoelectric sensor 7 returns a signal of "in need of supplement" to the controller 1.

Figure 2:
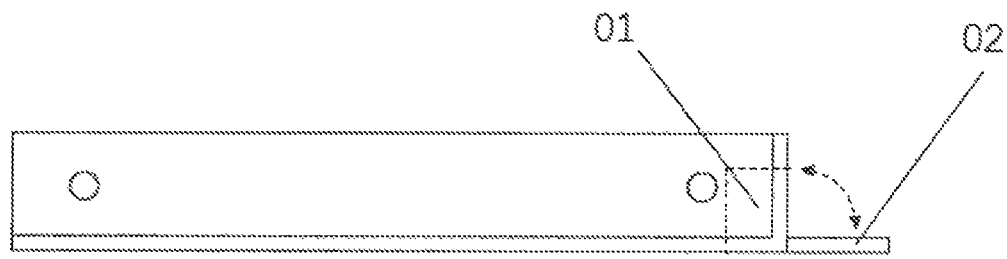
FIG. 2 is a schematic structural diagram of a tray in an embodiment of the present invention.

The structure of the tray 3 is as shown in FIG. 2, a movable baffle 02 is arranged at the bottom of the tray, and its opening and the closing are controlled by a steering engine 01. When the baffle is closed, the rice seedling bed is in a static storage state; when the baffle is opened, the rice seedling bed slides out and falls into the conveyor belt 4 below. The transplanter shown in FIG. 3 has 6 rows of transplanting platforms, and the corresponding photoelectric sensor 7, rubber connector 6, tray 3 and conveyor belt 4 are also arranged in 6 rows. During the transplanting operation of the transplanter the transplanting platform shakes to a certain extent due to uneven ground. In order to ensure that the seedling bed is stably conveyed through the conveyor belts 4 and enters the transplanting platform, each row of conveyor belts 4 is in flexible connection with the corresponding transplanting platform through a rubber connector 6, and the 6 rows of conveyor belts are controlled to rotate by a conveyor belt driving motor 5. Each tray 3 is preset with a rice seedling bed with a standard seedling tray size (the standard seedling tray size depends on parameters provided by the transplanter), and the movable baffle 02 has one opportunity to release; according to the size of the transplanter, n inclined trays are arranged in each row. Taking a 6-row transplanter as an example, the seedling bed automatic feeding device is carried, and the 6×n standard seedling bed of transplanter can be carried in one operation at most.

Figure 5:
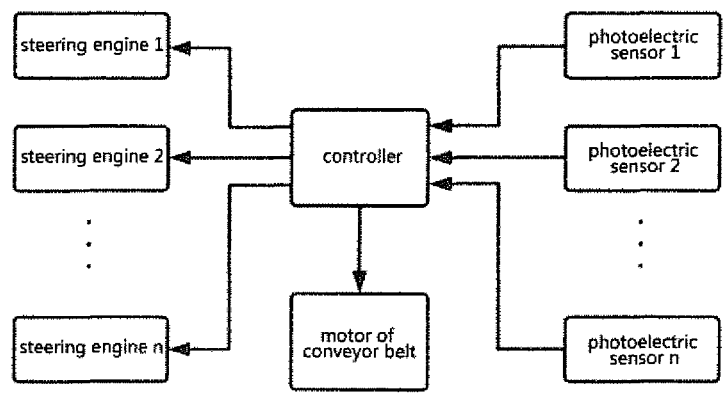
FIG. 5 is a schematic control diagram of a controller in an embodiment of the present invention.

Referring to FIG. 5, the photoelectric sensors located in each row function as the input of the control structure, and the conveyor belt motors and the steering engines located in each row function as the output of the controller control structure; the photoelectric sensors continuously return detection signals to the controller, and the controller determines whether the conveyor belt motor and the corresponding steering engines in each row need to be controlled to rotate or not according to the return signals. The present embodiment selects STM32 as the controller.

The above description is an overview of the operation of the mechanical mechanism and the automatic control mechanism of the present invention. In order to clearly illustrate the technical means and snake the technical means according to the content of the specification implementable, the following is a specific implementation flow of the automatic feeding device of the seedling bed of the transplanter.

Figure 6:
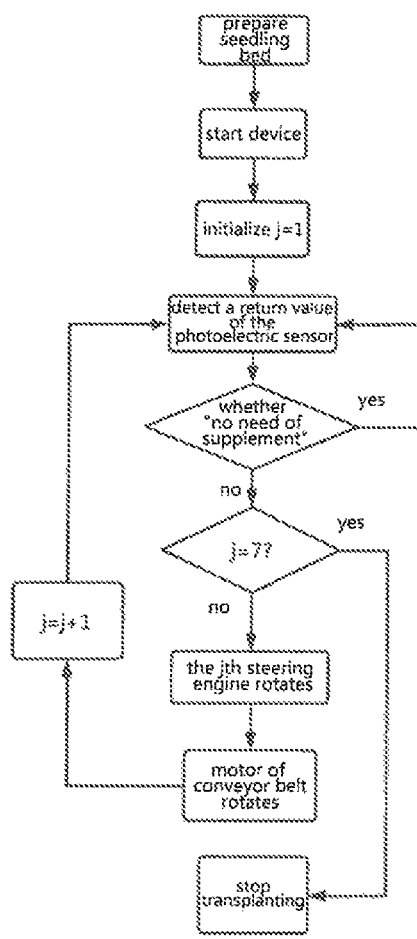
FIG. 6 is a flow chart of the automatic feeding method for the seedling bed of the transplanter in an embodiment of the invention.

Since each row of seedling transplanting mechanisms are independent of each other, the logic for implementation flow is consistent, so that one row is taken as an example, and its flow chart is as shown in FIG. 6, including the following steps:

step 1) loading each tray with a rice seedling bed of a fixed size, with the movable baffles all in a closed state.

step 2) starting the seedling bed automatic feeding device, and initializing each electronic device to enable the electronic device to operate normally.

step 3) using a variable j to represent the serial number of the inclined tray to be released at the present row, and initializing the variable j to be 1.

step 4) detecting a return value of the photoelectric sensor, and if the return value is "no need of supplement", continuing to detect.

step 5) if the return value is "in need of supplement", judging whether the variable j at the moment is equal to 7, and if the variable j is equal to 7, which indicates that the rice seedling bed loaded in the row are completely used up, stopping the transplanter to supply the seedling bed.

step 6) if j does not reach 7, controlling the steering engine of the jth inclined tray to rotate and releasing the rice seedling bed.

step 7) controlling the rotation of the motor of the conveyor belt, and conveying the seedling bed to the transplanting platform in the present row.

step 8) adding 1 to the value of the variable j, and continuing to detect the return value of the photoelectric sensor.

What is claimed is:

1. An automatic feeding device for a seedling bed of transplanter, comprising:
   a bracket, installed on the transplanter;
   several trays, obliquely arranged on the bracket downwards and used for placing the rice seedling bed, and bottom of the trays being provided with release mechanisms for releasing the rice seedling bed;
   a conveyor belt, arranged on the bracket, and positioned at the bottom of the tray, an end of the conveyor belt being connected with a transplanting platform of the transplanter;
   a photoelectric sensor, arranged on the transplanting platform and used for detecting the height of the remaining rice seedling bed on the transplanting platform;
   a controller, in communication connection with the photoelectric sensor, for sending a signal for controlling the tray to release the rice seedling bed, when the photoelectric sensor detects that the height of the remaining rice seedling bed on the transplanting platform is lower than the height of the photoelectric sensor.

2. The automatic feeding device tor a seedling bed of a transplanter according to claim 1, wherein the mechanism comprises a movable baffle arranged at an end of the tray and a steering engine for controlling rotation of the movable baffle.

3. The automatic feeding device for a seedling bed of a transplanter according to claim 1, wherein the bracket is mounted with a motor for controlling transmission of the conveyor belt, and the motor is in communication connection with the controller.

4. The automatic feeding device for a seedling bed of a transplanter according to claim 1, wherein the trays are arranged in several rows and mounted on the bracket.

5. The automatic feeding device for a seedling bed of a transplanter according to claim 4, wherein each row of the trays is correspondingly provided with the corresponding photoelectric sensor and conveyor belt.

6. The automatic feeding device for a seedling bed of a transplanter according to claim 1, wherein the conveyor belt is connected with the transplanting platform through a rubber connector.

7. An automatic feeding method for a seedling bed of a transplanter, which is realized based on an automatic feeding device for a seedling bed of a transplanter, comprising
   a bracket, installed on the transplanter;
   several trays, obliquely arranged on the bracket downwards and used for placing the rice seedling bed, and bottom of the trays being provided with release mechanisms for releasing the rice seedling bed;
   a convey belt, arranged on the bracket, and positioned at the bottom of the tray, an end of the conveyor belt being connected with a transplanting platform of the transplanter;
   a photoelectric sensor, arranged on the transplanting platform and used for detecting the height of the remaining rice seedling bed on the transplanting platform;
   a controller, in communication connection with the photoelectric sensor, for sending a signal for controlling the tray to release the rice seedling bed, when the photoelectric sensor detects that the height of the remaining rice seedling bed on the transplanting platform is lower than the height of the photoelectric sensor,
   wherein, the method comprising the following steps:
   step 1) assuming that the trays are arranged in several rows, with N trays in each row, loading each tray with a rice seedling bed of a fixed size, with release, mechanisms at the bottom of the trays ail in a closed state;
   step 2) initializing each electronic device to enable the electronic device to operate normally;
   step 3) using a variable j to represent a serial number of an inclined tray to be released in each row, and initializing the variable j to be 1;
   step 4) detecting a return value of the photoelectric sensor in a row at issue, and if the return value is "no need of supplement", continuing to detect;
   step 5) if the return value is "in need of supplement", judging whether the variable j at the moment is equal to N, and if the variable j is equal to N, indicating that the rice seedling bed loaded in the row are completely used up;
   step 6) if j does not reach N, controlling the steering engine of the jth inclined tray in the row to rotate and releasing the seedling bed;
   step 7) controlling transmission of the conveyor belt, and conveying the seedling bed to the transplanting platform of the transplanter;
   step 8) adding 1 to the value of the variable j, and continuing to detect the return value of the photoelectric sensor.

8. The method according to claim 7, wherein the release mechanism comprises a movable baffle arranged at an end of the tray and a steering engine for controlling rotation of the movable baffle.

9. The method according to claim 7, wherein the bracket is mounted with a motor for controlling transmission of the conveyor belt, and the motor is in communication connection with the controller.

10. The method according to claim 7, wherein the e trays are arranged in several rows and mounted on the bracket.

11. The method according to claim 10, wherein each row of the trays is correspondingly provided with the corresponding photoelectric sensor and conveyor belt.

12. The method according to claim 7, wherein the conveyor belt is connected with the transplanting platform through a rubber connector.

* * * * *